May 23, 1944.  P. GRABINSKI  2,349,263
VEHICLE
Filed Aug. 6, 1941  3 Sheets-Sheet 1
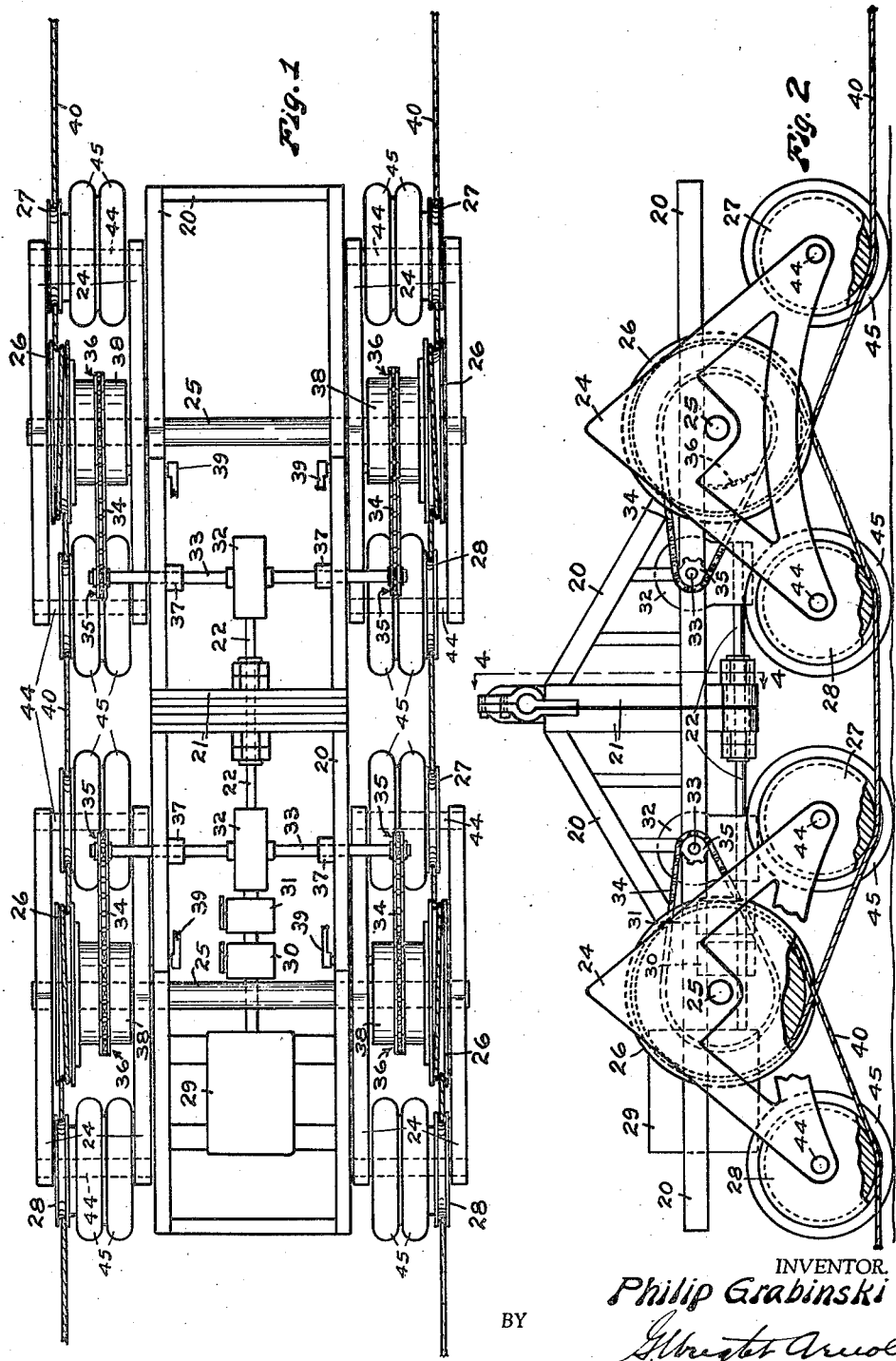
INVENTOR.
Philip Grabinski
BY
ATTORNEY

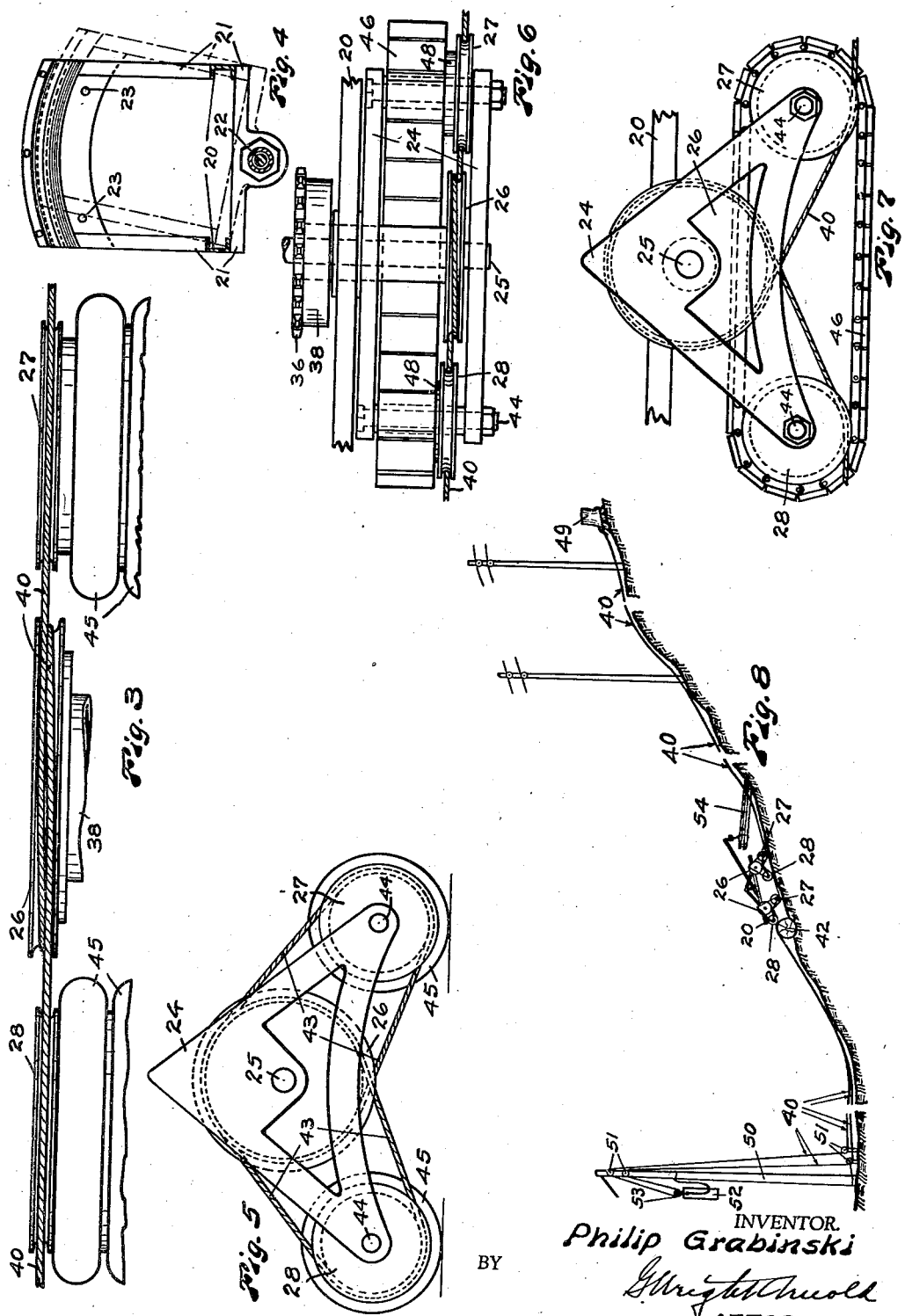

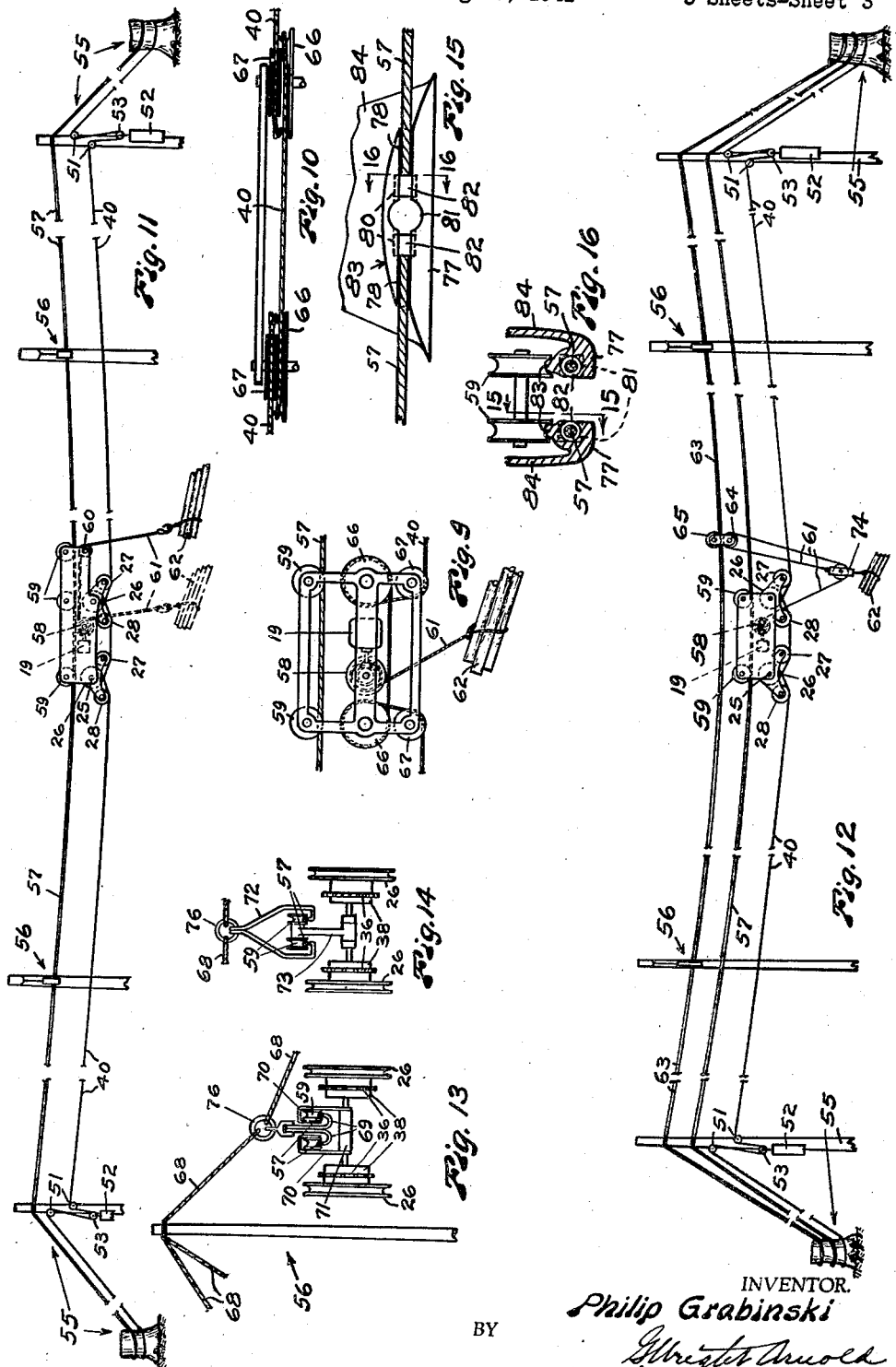

Patented May 23, 1944

2,349,263

UNITED STATES PATENT OFFICE 2,349,263

VEHICLE

Philip Grabinski, South Prairie, Wash.

Application August 6, 1941, Serial No. 405,653

9 Claims. (Cl. 104—235)

My invention relates to a vehicle characterized by its extreme mobility over substantially all terrain conditions and further characterized by its ability to transfer or transport materials of substantial bulk and weight.

The field of endeavor where my vehicle has particular utility includes the military and logging operations. For example, in the logging industry, selective logging, the character and distribution of the logs in a "stand," the terrain conditions, and the like have created a demand for an extremely mobile vehicle. Therefore, by way of illustration, but not as a limitation of my invention or its uses, I will describe my invention as applied to the logging industry.

An object of my invention is to provide a vehicle having both great mobility and a capability of logging over large areas as respects the more permanent loading locations.

An object of my invention is to provide a vehicle which may be moved by its own self-contained power system on established roadways, whether they be paved, unpaved or slightly developed road systems.

It is another object of my invention to provide a vehicle which may be moved by its own self-contained power plant over conditions, existing in the woods, where obstacles such as logs, stumps, etc. of a reasonable size are encountered and over which the vehicle may be moved from place to place.

It is a further object of my invention to provide a vehicle which may be suspended on overhead cables and driven by its own power plant so the vehicle may be used to transport logs and equipment over terrain which is substantially impassable for heretofore available ground vehicles.

It is another object of this invention to provide a vehicle with a self-contained power plant which drives a sheave system which sheave system may be employed for providing the driving traction means in connection with (1) endless rope or cable means with the vehicle on the ground and (2) long anchored rope or cable means with the vehicle either suspended from overhead cables or on the ground.

It is a further object of my invention to provide a system of driving sheaves in combination with cable means where the utmost traction between the cable means and the driving sheaves obtains.

It is a further object of my invention to provide a sheave system wherein two driven sheaves are employed, each of which functions as either a driving sheave or a slack take-up sheave, depending upon the direction of travel of the sheaves so that utmost traction may obtain between the driving sheave and a cable, all with a minimum number of wraps or turns of the cable around the driving sheave which is preferably less than one complete turn.

It is a further object of my invention to provide a vehicle driven by a self-contained power plant, movable by traction engagement with a cable, and having any suitable supporting means, as wheels with rubber tires, tractor beds, skis, skids, or overhead cable-ways.

It is a further object of my invention to provide a vehicle having driven sheaves engaging an anchored cable characterized in that utmost traction obtains between the said sheaves and the said cable so that the anchored cable may be relatively loose and not under strain and a relatively slight or insignificant portion of the strength of the cable is utilized in maintaining the cable taut and the maximum portion of the strength of the cable is utilized in the driving of the vehicle.

The necessity for the foregoing object of my invention is well illustrated by the fact that in present aerial cable systems employed in the logging industry if there is substantially a two thousand feet span between supporting towers and only five percent deflection is allowed of the cable between towers, then practical loggers calculate that only approximately one part of the strength of the cable may be used for carrying the load and about five parts of the strength of the cable must be reserved for merely keeping the cables under sufficient strain to prevent sagging or too great a deflection.

It is a further object of my invention to provide a driven sheave for engagement with a stationary cable, and which driven sheave is mounted on a movable support to absorb sudden shock and lessen the magnitude of strain which may be suddenly thrown on the cable or the driving sheave.

It is a further object of my invention to provide an aerial supporting cable system for a vehicle having supporting means of a character which may be readily commercially used in relatively close spaced relation so that less tautness of the supporting cable is required and greater utilization of the strength of the said supporting cable obtains for supporting the load.

It is a further object of my invention to provide a vehicle employing cables for traction and/or supporting the same in which is eliminated to the greatest degree, wear and strain on the cables employed to the end of obtaining long life and great utilization of the strength of the cables employed.

It is a further object of my invention to provide a vehicle having a driven sheave system and a plurality of anchored cables engaging therewith for traction of the vehicle and wherein the cables also function as providing a roadway (as it were) to permit the vehicle to travel over obstacles, as stumps and the like, which obstacles have a height greater than the radius of the supporting wheels of the vehicle.

It is a further object of my invention to provide a vehicle with a driven sheave system and a stationary cable cooperating therewith, which vehicle may be readily utilized to pull the stationary cable to the place or location needed without requiring additional or supplemental equipment to handle such cable.

The above mentioned general objects of my invention, together with others inherent in the same, are attained by the devices illustrated in the following drawings, the same being preferred exemplary forms of embodiment of my invention, throughout which drawings like reference numerals indicate like parts:

Figure 1 is a plan view of a vehicle embodying my invention, with parts shown somewhat diagrammatically and with the cables broken away;

Fig. 2 is a side elevation of a device shown in Figure 1, parts being broken away;

Fig. 3 is a fragmentary bottom plan view illustrating particularly the manner of reeving of the cables about one set of sheaves;

Fig. 4 is a view in elevation and with parts in section and parts not shown taken substantially on broken lines 4—4 of Fig. 2 to show the centrally positioned frame mounting means;

Fig. 5 is a fragmentary elevational view showing particularly the use of endless cables reeved about one set of driving and guide sheaves;

Fig. 6 is a fragmentary plan view illustrating particularly the use of vehicle supporting means, as an endless tractor bed, employed in place of the wheels with rubber tires thereon shown in Figs. 1 and 2;

Fig. 7 is a side elevation of the parts shown in Fig. 6;

Fig. 8 is a somewhat diagrammatic view illustrating a device embodying the present invention as the same may be used in connection with relatively long anchored cables;

Fig. 9 is a view in side elevation, and with parts somewhat diagrammatically shown and with some parts not shown, of a modified form of this invention and which may be utilized in connection with an aerial supporting cable means and an aerial traction providing cable means;

Fig. 10 is a fragmentary bottom plan view illustrating particularly the manner of reeving of the cables about the guide and driven sheaves on one side of the device shown in Fig. 9;

Fig. 11 is a somewhat diagrammatic view in side elevation with parts broken away illustrating a manner of use of the vehicle shown in Figs. 1 and 2 in connection with the aerial carrier cable means and with the load of logs, in full lines, suspended from the trailing portion of the vehicle, and in dotted lines suspended below the vehicle;

Fig. 12 is a somewhat diagrammatic view similar to Fig. 11 showing the use of a vehicle of my invention in connection with a plurality of sets of aerial supporting cables;

Fig. 13 is a fragmentary view illustrating one manner of supporting the over-head aerial carrier cable in a manner so that a vehicle of my invention will not be interfered with by the cable supporting mechanism;

Fig. 14 is a modified form of the cable supporting device shown in Fig. 13;

Fig. 15 is a view in side elevation, taken substantially on broken line 15—15 of Fig. 16 and showing a cable coupling member for coupling a track or supporting cable over which a carriage travels; and Fig. 16 is a fragmentary sectional view of the track cable coupling means taken substantially on broken line 16—16 of Fig. 15.

Referring to Figs. 1, 2 and 4, two main frame structures 20 are provided with rigidly connected upright frames 21 which are connected for pivotal movement as respects each other with the center of pivotal movement coaxial with the driven shaft 22. The provision of pivotal movement between the main frame structures 20 is desirable when the vehicle is used to move over land. This permits a vehicle to better conform to uneven structure of the surface or road, with contact of the various wheels on the ground, and without longitudinal and torsional strain to the vehicle. However, where the device is used as an aerial vehicle suspended from cables, as shown in Figs. 9, 11 and 12, preferably the pivotal movement of the main frame structures 20 as respects each other, is eliminated or locked, as by providing bolts through the openings 23 shown in Fig. 4 of the drawings.

Four pairs of frame means 24 are each mounted, respectively, for pivotal movement on an end portion of a shaft 25, each of which shafts is preferably rigidly secured to a main frame structure 20. Each pair of frame means 24 is pivotally mounted on the shafts 25 and may therefore pivotally move as respects the main frame structures 20. On each pair of frame members 24 are mounted a driven sheave 26, and guide sheaves 27 and 28. The sheaves 26 are driven sheaves and in order to illustrate one means of driving the same I have shown somewhat diagrammatically an internal combustion motor 29, a clutch 30, a variable speed power transmission 31, differentials 32, driven shaft 22 interconnecting differentials 32, axles 33, sprocket wheels 35 and 36 and link belts 34 interconnecting the sprocket wheels 35 and 36. The sprocket wheels 35 are mounted on the axles 33 and the axles 33 are journaled in bearings 37 in the main frame structures 20. Brake drums 38, sprocket wheels 36, and sheaves 26 are secured together and mounted for rotary movement on the shafts 25. Brake operating means 39, which are somewhat broken away and diagrammatically shown in the drawings, may be employed to brake or stop the sheaves 26 to permit the vehicle to be held by the cables 40.

The cables 40 shown in Figs. 1, 2, 3, 6, 7, 8, 9, 10, 11 and 12 may be secured at their ends to fixed objects, as shown in Figs. 8, 11 and 12 of the drawings, and movement of the vehicle will obtain by reason of traction between the driven sheaves 26 and the anchored cables 40. As shown in Fig. 8, the cables 40 will function not only as traction means, but will also function as a vehicle supporting means so that the vehicle may ride over relatively large objects, as a log 42 shown in Fig. 8.

Instead of reeving the fixed cable 40 about the driven sheaves 26 and guide sheaves 27 and 28, endless cable 43 (see Fig. 5) may be employed and the sheaves 27 and 28 will be driven sheaves. The endless cables 43 will be employed when the vehicle is driven over road beds and an endless cable 43 is preferably provided for each set of sheaves 26, 27 and 28. Under such conditions each driven sheave 26 will function as a driving sheave. However it is to be understood that if a driving sheave 26 and a slack pulling sheave 26 is desired in connection with an endless cable, then a cable may be reeved about two units, each comprising sheaves 26, 27 and 28, as shown in Figs. 1 and 2 by cable 40 and with the two ends reeved over sheaves 27 and 28 respectively and thence over sheaves 26 and then connected together to form an endless cable.

Axles 44 are supported by frame means 24 and said axles 44 rotatably mount a sheave 27 or 28 together with rubber tired wheels 45 which are secured to the sheave 27 or 28 and rotatably movable therewith.

Obviously other means, as previously mentioned, may be used to support and carry the weight of the vehicle, other than the rubber tired wheels 45 and I have shown as another example thereof the tractor bed 46 in Figs. 6 and 7. The said tractor beds 46 are mounted on drums 48 which drums 48 are fixed to rotating sheaves 27 or 28 and such tractor beds 46 will be driven upon rotation of the sheaves 27 and 28.

In Fig. 8 of the drawings, two cables 40 are shown secured at one end to a fixed object 49, which may be a stump or the like. In the event that the pulling strains are generally in one direction as when pulling up a mountain side in one direction and moving (with less strain) downward in the other direction, then I preferably employ one fixed support 49 at the higher elevation and a slack removing device at the lower elevation. In the event that strains of substantial magnitude are employed in both directions of travel, then preferably I employ a slack pulling device of the form shown in Fig. 8, at both ends of the cables 40.

As an illustration of a cable take-up device, I have shown in Fig. 3 a support 50, sheaves 51 and weight means 52 which is supported by a cable lap interconnecting the cables 40, and passing through a sheave 53 on the weight means 52. By such construction the weight 52 will serve to tension and take the slack out of the cable 40 but will not place an undue strain on such cable. In the event of a pull on the cables 40 greater than the pull of weight means 52, such pull will lift weight means 52 until 52 engages the support 50 so such support functions then as a stop. Similar cable take-up means are shown in Figs. 11 and 12 at the ends of cables 40.

By providing sufficient traction between the sheaves 26 and the cables 40, the vehicle may be moved and the cables 40 will serve as a traction means and also as a vehicle supporting means to permit the vehicle to move over obstacles, as log 42. Also as the guide sheaves 27 or 28 are mounted on a frame 24, which frame is in turn pivotally mounted, any undue strain on a cable 40 or on the sheaves 27 or 28 will cause a rotary motion of the frame members 24 which will thus function as a shock absorbing means. Also due to the fact that the sheave 27 or 28 will follow a cable 40 as a vehicle supporting means the device may move over obstacles, such as a log 42, even though the height of the obstacle is greater than the radius of the wheel or sheave 26 or 27.

In order to move the device to the woods under its own power, the vehicle may be equipped with endless cables 43 reeved about sheaves 26, 27 and 28, as described in connection with Fig. 5, and the vehicle may carry, as its load, the cables 40. The endless cables 43 may be placed on all four sets of the sheaves 26, 27, and 28 of the vehicle. Usually, however, the use of endless cables 43 on the two front sets or the two rear sets of sheaves 26, 27, and 28 will be sufficient under favorable conditions. The vehicle, when equipped with endless cables 43 is driven over general roadways or roadways which are passable by the vehicle so equipped and the same may be supported either on the rubber tired wheels 45 of Figs. 1 and 2 or by the tractor bed 46 of Figs. 6 and 7. Under such circumstances my vehicle will be equipped with any standard steering equipment (not shown) as "knuckle steering" of the type commonly employed on automobiles, or the relative drive on opposite sides of the vehicle type of steering commonly employed on wheeled or endless bed tractors. However, as the steering apparatus forms no part of my invention it is not illustrated or described. When the vehicle reaches conditions over which a vehicle so equipped may not pass, then the men may pay out enough of the cable 40 to provide two cables 40 secured to a fixed object in advance and to which the vehicle is to travel. Upon reaching the fixed object to which the cables 40 were attached, one side of the vehicle may be "jacked" off the ground so that the sheaves 26, 27 and 28 will function as a cable pulling device and the desired amount of cable may be pulled to the position where the vehicle is then positioned and carried forward to reach another fixed object ahead.

The previously mentioned procedure may be continued either using the cables 40 or the endless cables 43, depending upon the terrain until the vehicle has reached the finally desired fixed object, as 49 of Fig. 8. As the vehicle has thus proceeded on its course, it has left behind, when desired, two cables 40 which will serve as the traction means and as the vehicle supporting means for the vehicle. Then one end of each cable 40 is secured to the fixed object 49 and the other ends of such cables 40 are secured to a take-up device, such as that illustrated in Fig. 8 of the drawings. The vehicle may be thus used to haul logs 54, as illustrated in Fig. 8, down the sides of mountains and from logging stands which were heretofore considered inaccessible at a cost commensurate with the value of the logs.

I have shown the logs 54 dragging behind the vehicle and with one end of the logs 54 off of the ground as is the common practice in logging.

An important feature of my invention is the manner in which the cables 40 are reeved about the sheaves 26, 27 and 28 and the functional results obtained thereby. Referring to Figs. 1, 2, and 3 of the drawings, it will be noted, as respects the right hand side of such figures, that a cable 40 passes under guide sheave 27, thence under and around the sheave 26 and thence under guide sheave 28. As appears in Fig. 3 of the drawings, the guide sheave 27 is laterally slightly out of line with the sheave 26 and out of line with sheave 28 so that a cable 40 will be guided toward one side of the groove in the sheave 26 and thereafter after the cable 40 has made almost a complete wrap around the sheave 26 the cable 40 will be guided to the other side of the groove in the sheave 26 and toward the guide sheave 28 which is in line with the opposite side of the groove of the sheave 26 from the side of said groove which was lined up with the guide sheave 27. I am thus able to obtain almost a complete wrap of the cable 40 around the sheave 26 and at the same time there is no rubbing between the various portions of the cables 40 as they pass around the sheave 26.

By the use of two units 26, 27, 28 on the same side of the device and engaging the same cable 40, the trailing sheave 26 will function to take up cable and keep the cable taut leaving the advancing sheave 26, and thus the sheave 26 which is in advance, so far as the movement of the vehicle is concerned, will be able to apply its maximum power and obtain traction from the cable 40. As the cable 40 when leaving the trailing sheave 26 is somewhat loose, the greatest utility of the said trailing sheave 26 will be as a cable take up device and not as a driving sheave so far as movement of the vehicle is concerned. While the trailing sheave 26 will provide some traction for the driving of the vehicle, this is of minor significance and for such reason the trailing sheave 26 is denoted by its primary function of a cable take up sheave.

Referring to Fig. 2 of the drawings, if the device is moving towards the right, then the right or advance sheave 26 will function as a driving sheave and the trailing sheave 26 will function as a cable take-up sheave. On the other hand, if the device is moving towards the left, as shown in Fig. 2 of the drawings, the then forward or advancing sheave 26 will function as the driving sheave and the then trailing sheave 26 will function as a cable take-up sheave. The correlation between the sheaves 26 is similar to the action of a driven drum which is used in the woods and is used on ships. In the woods, such a driven drum is generally termed a "gypsy," or a "nigger head." In such instances the driven drum is horizontal. On the other hand, in marine work, a driven drum, there vertically positioned and termed a "capstan," is employed. In either instance a cable or rope is wrapped one or more times around the driven drum and a man pulls on the free end of the cable or rope merely to keep the line taut about the rotating drum. The amount of pressure necessary to keep the line taut about a drum is very small compared to the traction between the rope or cable and the driven drum. Depending upon the size of the driven drum the number of wraps of the cable or rope around the driven drum, it is common for men to place a tension, of say fifty or a hundred pounds, merely to keep the line taut while the line is pulling many thousands of pounds load.

In my device I have a mode of operation similar to the so-called "gypsy" or the so-called "nigger-head," or the "capstan." Relatively small traction need obtain between the trailing sheave 26 and the cable 40 to provide the necessary tension to serve as a cable take-up device and at the same time so long as the cable 40 is taut around the advancing sheave 26, then the advancing sheave 26 will function as the power transmitting device and substantial traction may be provided with relatively small wheels and with only one wrap of the cable 40 around a traction sheave 26. Furthermore, by providing such structure, I need not have the cable 40 in passing around the sheave 26 cover more than one lap so there will be no rubbing between passing portions of the cable. Also the line or cable vehicle supporting means 40 from one end to the other need not be taut to waste the strength of such cable in maintaining the same taut. In other words I am able to maintain a cable vehicle supporting means 40, as illustrated in Fig. 8 of the drawings, with very little tension on the vehicle supporting means or cableway 40 so that substantially all of the strength of the cable may be utilized in carrying a load rather than merely maintaining a cable taut.

A further feature inherent in the mode of operation of my device is that should a trailing sheave 26 fail to pull sufficiently to provide necessary traction between the advance or traction sheave 26 and a cable 40, then manual power may be applied to the cables 40 behind the vehicle and by the action previously explained, the trailing sheave 26 will have its slack removed and will exert a tension on the cable 40 many times greater than the applied manual power. In such manner the traction between the driving sheave 26 and the cable 40 may be such as to prevent slippage.

Referring to Figs. 9 to 16 inclusive of the drawings, I have shown modifications of my invention where the vehicle is employed in connection with aerial supporting cable means. In Figs. 11 and 12 I have illustrated diagrammatically the essential part of the vehicle previously described which will include driven sheaves 26 and guide sheaves 27 and 28 and the cables 40. In the interest of clearness many parts are not shown in these figures, as for example the driving means for sheaves 26. The cables 40 are connected to fixed supports 55 (Figs. 11 and 12). The supporting cables 57 are also connected to such fixed supports 55 and also when necessary, between fixed supports, to other supports 56 (somewhat diagrammatically illustrated in Figs. 11 and 12 and shown more in detail in Figs. 13 and 14).

In Fig. 11 (see also Figs. 13 and 14), I have shown a pair of supporting cables 57 in addition to the traction cables 40. The supporting cables 57 will be connected to the fixed supports 55 and also connected to the intermediate supports 56, as will be explained in connection with Figs. 13 and 14. The traction cables 40 will be connected only to the fixed supports 55 and not to the intermediate supports 56. Sheaves 59 are connected to the frame of the vehicle and serve to suspendedly support the vehicle from the supporting cables 57. A driven drum 58 is connected to a motor unit 19 so that the cable 61 supporting the logs 62 may feed directly therefrom or may feed over the sheave 60 so that the load may be carried directly under the vehicle or trailing the vehicle as desired. In the full line position in Fig. 11 I have shown the load of logs 62 as being trailed from the vehicle while in the dotted line position, the cable 61 will support the logs directly under the vehicle.

In Fig. 12 I have shown a modification of the structure just described in connection with Fig. 11 and in which many parts are similar to the parts of Fig. 11 and are therefore similarly numbered. The additional feature shown in Fig. 12 is that an additional supporting cable means is employed. This additional cable 63 by suitable use of blocks and tackle may be employed to support any portion of the load desired. For example, in Fig. 12 the cable 61 from the drum 58 is reeved through block 74 and block 64 and sheave 65 is carried by cable 63. With such an arrangement of blocks and the cable 61, the cables 63 will carry two-thirds of the load, while the cable 57 will only carry one-third of the load. Obviously, the proportion may be modified or changed as desired, the above setting forth only one manner in which a plurality of cables and a plurality of sheaves may be employed to support a vehicle embodying my invention for an aerial trackway. In this Fig. 12, the cable 63 is preferably secured to all supports 55 and 56 while the cables 40 and 57 are only secured to the fixed support 55. The cables 40 must pass about sheaves 26, 27, 28 so they should not be secured to supports 56. If the supports of Figs. 13 and 14 were employed to secure cables 57 of Fig. 12 to supports 56 there would be interference. However, other supports, as protruding arms, can readily be utilized, should it be desired to support cables 57 of Fig. 12 by supports 56. The traction cables 40 in Figs. 11 and 12 are provided at both end portions with take-up devices 51, 52 and 53 similar to the previously described take-up devices shown in Fig. 8 and which are similarly numbered.

By the use of the sheaves 26, 27 and 28, which have been described in connection with the preceding figures, I am able to use supporting wheels or supporting tractor beds connected with the sheaves 27 and 28 as described. This provides for a land vehicle which has many advantages, some of which have been previously described. Also the same vehicle may be used in connection with an aerial trackway and function as has been described. In the event that my invention is to be used in a more or less permanent aerial trackway system, the invention may be modified as illustrated in Figs. 9 and 10 of the drawings. In such Figs. 9 and 10 the cables 57 will function as the supporting means for the vehicle and track for sheaves 59. Also the said cables 57 will be supported by supports, as 55 and 56. The structure in Figs. 9 and 10 also includes sheaves 66 and 67. The sheaves 66 function as the driving and take-up sheaves similar to the sheaves 26, previously described. The sheaves 67 are guide sheaves so that the cable 40 may be reeved under and around a portion of a sheave 67 to the sheaves 66. Thence substantially one lap around a sheave 66 to the next sheave 66 and thence around said sheave 66 for substantially one wrap and thence around and below the remaining sheave 67.

Referring to Fig. 10 of the drawings, the sheaves 66 are driven by means (not shown). It will be apparent that the sheaves 67 are in line and off-set as respects the sheaves 66 which are in line. I am thus able to reeve a cable 40 around a sheave 67 and thence to one side of the groove of a sheave 66 and around the sheave 66. In view of the fact that both sheaves 66 are in line and off-set relative to the sheaves 67, the portion of the cable 40 passing directly between the sheaves 66 will not rub on that portion of the cable which passes between the sheaves 66 and 67. The sheave 66 which is on the advancing end of the vehicle will serve as the traction sheave and the sheave 66 on the trailing end of the vehicle will serve as the take-up sheave, similar to the action of the sheaves 26 explained in connection with the previous figures. Thus the cable 40 may be slack or merely taut as compared to being under strain in connection with the device shown in Figs. 9 and 10, as well as in connection with the device shown in the previous figures. The main advantage of the modification of my invention shown in Fig. 9 is that non-essential parts for an aerial system have been eliminated.

In order that the device, shown either in Figs. 11 or 12 or Figs. 9 and 10, may pass the intermediate support 56, structure as that shown in Figs. 13 and 14 of the drawings is employed. In such views I have shown two sheaves 26 which will engage the cable 40. Obviously such sheaves might well be the sheaves 66 of Figs. 9 and 10. The remainder of the vehicle, which is not shown in Figs. 13 and 14, does not functionally enter into the matter there illustrated. Figs. 13 and 14 illustrate merely a way of supporting a cable 57 or 63 by an intermediate support 56, so that the device may pass such intermediate support 56. The ring 76 is supported in spaced relation to the upright of support 56. The upright support may be in the woods a tree or the like, and the guy lines 68 would be connected to suitable supporting means so as to provide the ring 76 in lateral spaced relation to the upright support. In Fig. 13 two angle shaped supports 69 are positioned adjacent each other and connected to the ring 76. The angle shaped supports 69 have outwardly projecting portions which support the cables, as 57, in spaced apart relation. Yoke shaped supports 70 carry the sheaves 59 and such yoke shaped supports are in turn supported by frame means 71 connected with the sheaves 26.

In Fig. 14 I have shown an alternative construction of the structure shown in Fig. 13. In such Fig. 14, the ring 76 is supported as in Fig. 13 and such ring 76 supports a yoke member 72 which has supporting cables 57 supported thereby and positioned between its supporting arms. In other words, in Fig. 13 the members 69 are adjacent each other and project downwardly and then outwardly so such members 69 are between the cables 57, while in Fig. 14, the members 72 project outwardly, then downwardly and then inwardly so that the members 72 are outside of the cables 57. In Fig. 14, the frame means 73 functions to connect the vehicle supporting sheaves 59 with the main frame of the vehicle and which in turn supports sheaves 26 and the other part of the vehicle connected therewith.

The cable means 57 or 63, which are supporting cables, each may be made of a single cable, or of a plurality of cables connected together, which may be necessitated by the lengths involved or breakage of cables. Cables 57 or 63 may be connected together by any suitable cable connectors which will provide a suitable track.

Figs. 15 and 16 show a preferred form of cable coupling means that may be used, said cable coupling means comprising a body member 77 having in one side two aligned longitudinal grooves 78 with their end portions terminating in sockets 80 of larger size than the grooves. The sockets 80 are connected by a transverse recess 81. The respective ends of the cables 57 to be coupled are each provided with an enlarged rigidly attached cable fitting 82 of conventional form. An arched track member 83 provides an easy curve by way of which a wheel 59 may pass over the coupling member. The end portions of the cables 57 are connected with the coupling member by inserting the cables 57 in the grooves 78 from the side—the fittings 82 being inserted, one after the other, in the recess 81 and then drawn into the sockets 80 where they will be held as long as tension is exerted on the cables. Hangers 84 are provided on the body members 77 for supporting the same in desired vertical alignment.

From the foregoing it is obvious that my vehicle is one characterized by utmost mobility under substantially all conditions. For example, where a road exists to the extent that the same is traversable by prior art vehicles, my invention may employ the endless cables 43 of Fig. 5.

In the event that obstacles are encountered, which render it impossible to move a vehicle with a multiple wheel drive (as shown in Figs. 1 and 2), or with a tractor bed (such as shown in Figs. 6 and 7), and with an endless cable (as endless cable 43) driving such multiple wheel drive or such tractor bed, then the cables 40 of Figs. 1 to 4, and 6 to 8 may be employed so that such cables 40 will function as a traction providing means and also as a vehicle supporting means.

In the event that substantial distances of aerial travel are necessary, then my vehicle may be employed in the form shown in Figs. 9 to 14, where supporting cables 57 are employed or a plurality of supporting cables 63—57 are employed. Preferably the supporting cables are employed in pairs to limit swinging movement of the vehicle, but obviously swinging movement need not be under all conditions positively eliminated and only one cable cooperating with a centrally located sheave means on the vehicle may be used where it is not necessary to positively eliminate swinging movement.

In the event of such substantial aerial use, the device as shown in Figs. 9 to 14 may take the form of the device shown in the earlier figures so as to be mobile on land and to the aerial supporting means, or it may be reduced to its more essential parts as shown in Figs. 9 and 10.

My vehicle when used in the foregoing described manners, or combinations thereof, will be a self-contained vehicle and may carry with it any necessary auxiliary equipment. Also, when my vehicle is designed for substantial rough terrain, it is obvious that a low center of gravity is desirable.

Besides the logging industry and the military, important uses of my invention will be in bridge building, mining operations and the like. Aerial trackways where a traveling power driven line or cable is employed have proven to be of limited value and of little practical value where long distances are involved. In my invention, I do not employ power driven traveling lines, but employ a stationary line, as cables 40, and provide means so that a maximum traction obtains between a driven sheave and a stationary line. Further, I have provided means so that there is no rubbing or chafing of the cables, as occurs when cables pass or contact each other, and I obtain minimum wear on the cable with a maximum traction between the cables and the driving sheave. This maximum traction and minimum wear likewise obtains when a device of my invention is employed to the end that the device is stationary and the line is driven.

Obviously, changes may be made in the forms, dimensions and arrangement of the parts of my invention, without departing from the principle thereof, the above setting forth only preferred forms of embodiment.

I claim:

1. In a vehicle of the class described, a first frame member; a longitudinally spaced second frame member pivotally secured to said first frame member for lateral pivotal movement between the said frame members; a driven traction sheave; a driven slack pulling sheave; a prime mover, as a motor, connected with said driven traction and said driven slack pulling sheaves; guide sheaves; an anchored stationary traction cable reeved about said driven traction sheave, said driven slack pulling sheave, and said guide sheave; and vehicle supporting means carried by said frame members and adapted to rest on a supporting surface, whereby the vehicle supporting means may follow the contour of the supporting surface with resultant relative movement between the two frame members.

2. In a vehicle of the class described, endless cable means; a driven sheave; a prime mover, as a motor, connected with said driven sheave; a guide sheave positioned in advance of the said driven sheave and positioned out of direct alignment with said driven sheave and aligned to lead the cable means under the said guide sheave and angularly toward and around the driven sheave; a second guide sheave positioned out of direct alignment with the driven sheave and aligned to lead the cable from the driven sheave angularly toward and around the second guide sheave and thence back to and around the first guide sheave; and vehicle support and traction means driven by said guide sheaves.

3. In a vehicle of the class described, vehicle frame means; driven sheave means positioned intermediate the length of the vehicle frame means; a prime mover, as a motor, connected with said driven sheave; first guide sheave means positioned at the advancing end portion of said vehicle frame means, said sheave means functioning also as a support for the vehicle; second guide sheave means positioned at the trailing end portion of said vehicle frame means, said sheave means functioning also as a support for the vehicle; and a stationary cable means, anchored at at least one end, reeved under the first guide sheave means, thence reeved about the driven sheave means, and thence reeved under the second guide sheave means, whereby said stationary cable means will function as traction means for the driven sheave means and will support the vehicle over obstacles of a contour and height greater than that over which the guide sheaves will normally travel.

4. In a device cooperating with cable means for relative movement therebetween, a driven sheave rotatable in a vertical plane; a prime mover, as a motor, connected with said driven sheave; a guide sheave rotatable in a vertical plane and positioned in advance of and extending below the said driven sheave and aligned to lead the cable means under the said guide sheave and under and about the said driven sheave; a second guide sheave rotatable in a vertical plane and positioned in the rear of and extending below the said driven sheave and aligned to lead the cable means from the said driven sheave and under said second guide sheave; and means maintaining the axes of rotation of said driven sheave and said guide sheaves fixed relative to one another, whereby the cable portions leading to and leaving the said driven sheave will pass in the air and less than a complete wrap of the cable around the said driven sheave obtains.

5. In a vehicle cooperating with cable means for relative movement therebetween, a driven sheave rotatable in a vertical plane; a prime mover, as a motor, connected with said driven sheave; a guide sheave rotatable in a vertical plane and positioned in advance of and extending below the said driven sheave and aligned to lead the cable means under the said guide sheave and under and about the said driven sheave; a second guide sheave rotatable in a vertical plane and positioned in the rear of and extending below the said driven sheave and aligned to lead the cable means from the said driven sheave and under said second guide sheave; means maintaining the axes of rotation of said driven sheave and said guide sheaves fixed relative to one another, whereby the cable portions leading to and leaving the said driven sheave will pass in the air and less than a complete wrap of the cable around the said driven sheave obtains; and means supporting said vehicle for traveling movement.

6. In a vehicle cooperating with cable means anchored at at least one end, first and second driven sheaves rotatable in a vertical plane; a prime mover, as a motor, connected with said driven sheaves; a first guide sheave rotatable in a vertical plane and positioned in advance of and extending below the first driven sheave and aligned to lead the cable means under the said guide sheave and under and about the first driven sheave; a second guide sheave rotatable in a vertical plane and positioned in the rear of and extending below the first driven sheave and aligned to lead the cable means from the first driven sheave and under said second guide sheave; means maintaining the axes of rotation of said first driven sheave and said first and second guide sheaves fixed relative to one another, whereby the cable portions leading to and leaving said first driven sheave will pass in the air and less than a complete wrap of the cable around said first driven sheave obtains; a third guide sheave rotatable in a vertical plane and positioned in advance of the second driven sheave and extending below the second driven sheave, said second and third guide sheaves aligned to lead the cable means therebetween and under and about the second driven sheave; a fourth guide sheave rotatable in a vertical plane and positioned in the rear of and extending below the second driven sheave and aligned to lead the cable means from the second driven sheave and under said fourth guide sheave; means maintaining the axes of rotation of said second driven sheave and said third and fourth guide sheaves fixed relative to one another, whereby the cable portions leading to and leaving said second driven sheave will pass in the air and less than a complete wrap of said cable around said second driven sheave obtains, and pull exerted by said second driven sheave on said cable pulls slack and thereby augments the traction of the first driven sheave to the cable; and means supporting the vehicle for traveling movement.

7. In an aerial carrier device having a supporting cable, sheaves supported by and traveling on said cable, and a carrier supported by and connected with said sheaves, a driven traction sheave rotatable in a vertical plane; a driven slack pulling sheave rotatable in a vertical plane; a prime mover, as a motor, connected with said driven traction and said driven slack pulling sheaves; guide sheaves rotatable in vertical planes and positioned in the same direction from said driven traction and slack pulling sheaves, as below the same, and also positioned respectively in advance of and in the rear of said driven traction and slack pulling sheaves; means maintaining the axes of said driven and guide sheaves fixed relative to one another; and an anchored stationary traction cable reeved about said driven traction sheave for almost a complete wrap, about said driven slack pulling sheave for almost a complete wrap, and about said guide sheaves, and guided by said guide sheaves to prevent contact between portions thereof.

8. In a vehicle of the class described, frame means; a first sheave supporting frame means pivotally mounted on said frame means; a driven traction sheave mounted on said frame means and coaxial with said first sheave supporting frame means; guide sheave means on said first sheave frame supporting means; a second sheave supporting frame means pivotally mounted on said frame means; a driven slack pulling sheave mounted on said frame means and coaxial with said second sheave frame supporting means; a prime mover, as a motor, mounted on said frame means and connected with said driven traction and said driven slack pulling sheaves; guide sheave means on said second sheave supporting frame means; and an anchored stationary traction cable reeved about said driven sheave, said slack pulling sheave, and both said guide sheave means, whereby upon undue strain the said sheave supporting means may pivot and function as shock absorbing means; and means supporting the vehicle for traveling movement.

9. In a device cooperating with cable means for for relative movement therebetween, a driven traction sheave rotatable in a vertical plane; a driven slack pulling sheave rotatable in a vertical plane; a prime mover, as a motor, connected with said driven traction and said driven slack pulling sheaves; guide sheaves rotatable in vertical planes and positioned in the same direction from said driven traction and slack pulling sheaves, as below the same, and also positioned respectively in advance of and in the rear of said driven traction and slack pulling sheaves; means maintaining the axes of said driven and guide sheaves fixed relative to one another; and a traction cable reeved about said driven traction sheave for almost a complete wrap, about said driven slack pulling sheave for almost a complete wrap, and about said guide sheaves, and guided by said guide sheaves to prevent contact between portions thereof.

PHILIP GRABINSKI.